United States Patent [19]

Morland

[11] Patent Number: 5,140,250

[45] Date of Patent: Aug. 18, 1992

[54] PROTECTIVE CIRCUIT FOR BATTERY POWERED ENGINE IGNITION SYSTEM

[75] Inventor: Jason L. J. Morland, London, England

[73] Assignee: Motronix Limited, London, United Kingdom

[21] Appl. No.: 640,305

[22] PCT Filed: Jul. 28, 1989

[86] PCT No.: PCT/GB89/00867

§ 371 Date: Jan. 29, 1991

§ 102(e) Date: Jan. 29, 1991

[87] PCT Pub. No.: WO90/01435

PCT Pub. Date: Feb. 22, 1990

[30] Foreign Application Priority Data

Aug. 1, 1988 [GB] United Kingdom ............... 8818247

[51] Int. Cl.$^5$ ............................. H02H 7/18; H02J 7/04
[52] U.S. Cl. ............................. 320/13; 320/2; 307/10.7
[58] Field of Search ............... 361/92; 307/10.7; 320/12, 2, 13

[56] References Cited

U.S. PATENT DOCUMENTS

| | | | |
|---|---|---|---|
| 3,646,354 | 2/1932 | Von Brimer | 307/10 BD |
| 4,141,332 | 2/1979 | Wyler | 123/148 R |
| 4,149,093 | 4/1979 | D'Alessio et al. | 307/10.7 |
| 4,218,717 | 8/1980 | Shuster | 361/79 |
| 4,259,600 | 3/1981 | Fellrath et al. | 307/270 |
| 4,312,029 | 1/1982 | Zellmer | 363/21 |
| 4,493,001 | 1/1985 | Sheldrake | 361/92 |
| 4,531,190 | 7/1985 | Drews et al. | 364/431.11 |
| 4,581,571 | 4/1986 | Hansen | 320/13 |
| 4,736,145 | 4/1988 | Sakurai et al. | 318/563 |
| 4,755,725 | 7/1988 | Kastendieck et al. | 315/360 |
| 4,902,956 | 2/1990 | Sloan | 320/13 |
| 4,905,115 | 2/1990 | Whidden et al. | 361/92 |
| 5,024,205 | 6/1991 | Gatza et al. | 123/632 |
| 5,032,825 | 7/1991 | Kuznicki | 340/636 |

FOREIGN PATENT DOCUMENTS

| | | |
|---|---|---|
| 0203262 | 12/1986 | European Pat. Off. |
| 3609718 | 10/1986 | Fed. Rep. of Germany |
| 2072966 | 10/1981 | United Kingdom |
| WO820434 | 9/1982 | World Int. Prop. O. |

Primary Examiner—Steven L. Stephan
Assistant Examiner—Ben Davidson
Attorney, Agent, or Firm—Shoemaker & Mattare, Ltd.

[57] ABSTRACT

A battery protection circuit for an engine ignition system comprises first and second terminals for connection in series with a discharge circuit of the battery and normally ON switching means connected between said terminals. If the battery voltage falls below a predetermined level, for example, as a result of leaving the headlights on in a parked motor vehicle, incorporating the circuit in its ignition system, the switching means turns OFF and isolates the battery, so as to prevent further discharge of the battery. The switching means can be reset by the user, for example, by means of a signal from a handheld I.R. transmitter on returning to the vehicle, enabling the ignition coil to be energized from the battery and the engine to be started. Thus the circuit can be used to prevent a vehicle battery from going flat when the vehicle is parked.

10 Claims, 3 Drawing Sheets

PROTECTIVE CIRCUIT FOR BATTERY POWERED ENGINE IGNITION SYSTEM

The present invention relates to the protection of a battery-powered engine ignition system against inadvertent discharge of the battery.

The invention is applicable particularly but not exclusively to the engine ignition systems of cars and other motor vehicles. It is not uncommon for a car driver to inadvertently leave the vehicle lights switched on when he parks the car, with the result the car battery is completely discharged when he returns, so that the engine ignition system cannot be used to start the engine. Similar problems can arise in other modes of transport which rely on a battery-powered engine ignition system.

An object of the present invention is to overcome or alleviate such problems.

Accordingly, the invention provides a protective circuit for a battery-powdered engine ignition system, said circuit including first and second terminals for connection in series with a discharge circuit of the battery, and normally ON switching means connected between said terminals, said circuit being arranged to switch said switching means OFF in response to an input signal indicative of partial battery discharge and the switching means being resettable by a user from OFF to ON to enable the engine ignition system to the activated by the battery when it is partially discharged.

The invention also includes within its scope a battery-powered engine ignition system incorporating such a protective circuit with its first and second terminals connected in series with a discharge circuit of the battery.

Such a protective circuit or engine ignition system may be incorporated in any vehicle, boat, aircraft or hovercraft which relies on electric power for starting its engine and accordingly it will be noted that the application of the invention is not restricted to motor vehicles.

Particularly in cases where the battery voltage declines significantly during discharge, the protective circuit is suitably responsive to an input signal in the form of a sensed battery voltage which is below a predetermined level. However, it is envisaged that other means for detecting discharge of the battery may be employed to generate the required input signal; for example, a sensor may be arranged to detect the discharge current of the battery when the engine is switched off and to generate said input signal when the discharge current exceeds a predetermined value for a predetermined time, or a function of discharge current and time reaches a predetermined value which is indicative of significant battery discharge.

Preferably the switching means is resettable by the user from OFF to ON by means of a further input signal which temporarily varies a voltage level within the circuit. This provides sufficient time for the user to energise the ignition system (e.g. by turning the ignition key in the case of a motor vehicle) so that the engine starts. Preferably a control signal is generated, for example, from the voltage on the ignition coil, which overrides said input signal and maintains the switching means ON whilst the ignition system is energised. However, in some cases the battery voltage may rise sufficiently in response to charging of the battery that the switching means remains reset in the ON condition and the above-mentioned control signal is unnecessary.

In accordance with a further preferred feature of the invention, the protective circuit is so arranged that the switching means can be set to the OFF state by a further input signal from the user so as to prevent the ignition being activated until the switching means is reset by the user. This is a useful theft-prevention measure since it prevents an authorised activation of the ignition system. For example, a motor vehicle may be provided with an infrared or ultrasonic receiver on its exterior which is arranged to reset the switching means to the ON state in response to a predetermined infrared or ultrasonic signal generated by a hand-held transmitter operated by the user of the vehicle on returning to the vehicle. Before leaving the vehicle, the user may deactivate the ignition system by setting the switching means to the OFF state and can reset the switching means to the ON state by means of a suitable hand-held transmitter before re-entering the vehicle. Any unauthorised person who did not have a transmitter arranged to generate a suitable coded signal would not be able to start the engine even if he gained access to the driving compartment, the ignition switch and the main electrical system of the vehicle.

Further advantages of the invention will be apparent from the following description by way of example only, with reference to FIGS. 1 and 2 of the accompanying drawings, of which:

Figure 1:
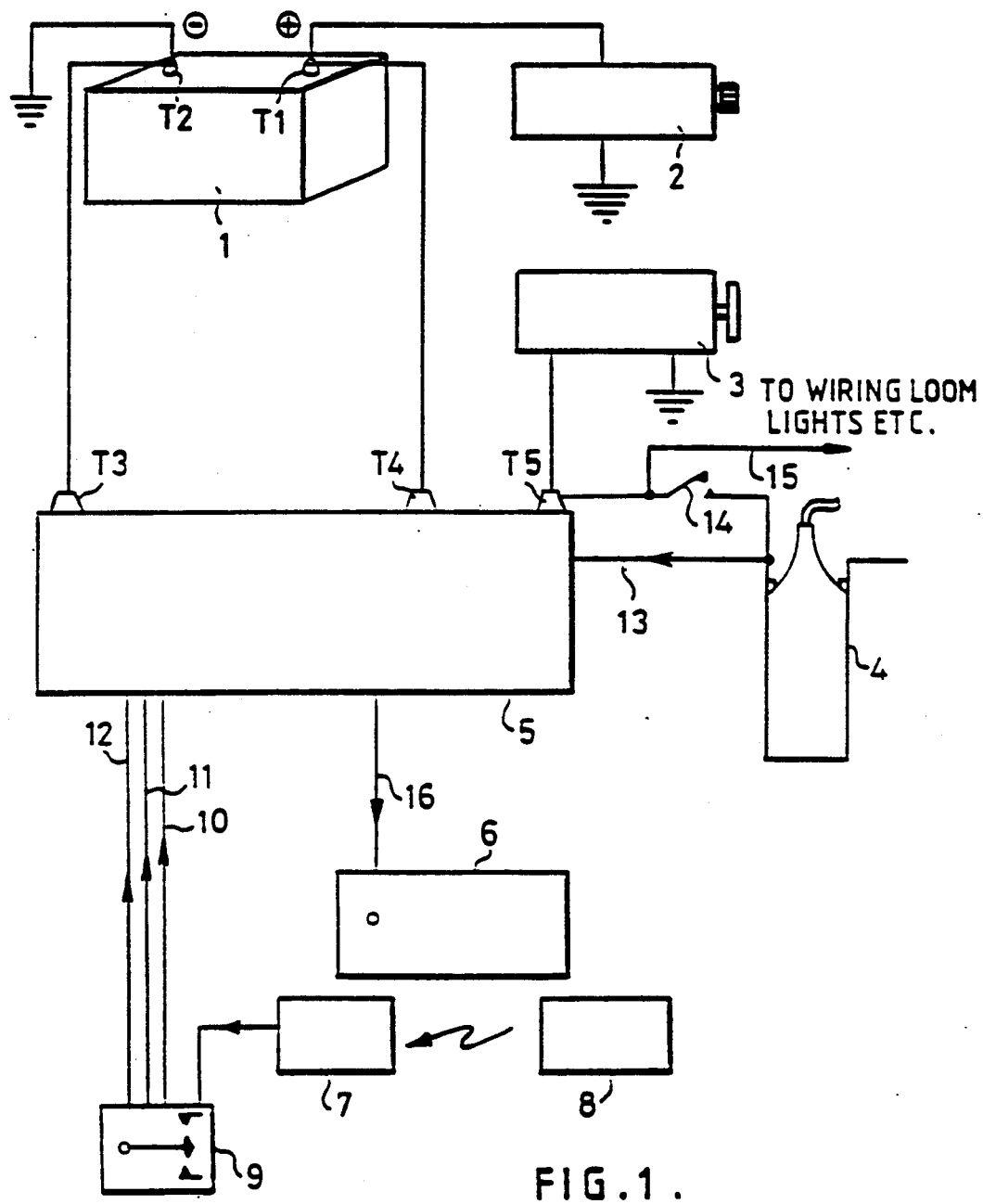
FIG. 1 is a diagrammatic representation of an ignition system in accordance with the invention for a motor vehicle.

Referring to FIG. 1, the ignition system shown comprises a nominally 12 voltage lead-acid battery 1 which is connected to a starter motor 2 and to an alternator 3 and ignition coil 4 and electrical system of the vehicle via a protective circuit 5 in accordance with the invention.

Protective circuit 5 which is described in detail below with reference to FIG. 2, comprises three main terminals T3, T4 and T5. Terminals T3, T4 are connected to negative and positive terminals T2 and T1 respectively of battery 1 and terminal T5 is connected to the positive terminal of an ignition coil 4 via ignition switch 14 and to the wiring loom for the lights and other electrical systems of the vehicle by a conductor 15. It will be understood that the vehicle chassis constitutes a negative earth.

Protective circuit 5 is arranged to provide either a closed circuit condition or an open circuit condition between terminals T4 and T5 in dependence upon input signals received from conductors 10, 11 and 12 and a control signal from ignition coil 4 received via conductor 13. To this end, protective circuit 5 incorporates a high-power switching transistor Q2 (FIG. 2) connected between terminals T4 and T5 which acts as a "switching means" and isolates battery 1 from all discharge paths except that through the starter motor 2.

A single pole 2-way switch 9 is provided in the driving compartment of the vehicle and before leaving the vehicle, the user operates switch 9 to connect conductor 11 to conductor 12 and thereby create an open circuit condition between terminals T4 and T5, isolating battery 1 from the ignition system. Assuming he cannot gain access to the protective circuit 5, a potential car thief is then prevented from activating the ignition system to start the engine.

On returning to the vehicle, the user transmits an infrared or ultrasonic signal from a hand-held transmitter 8 to an appropriate receiver 7 which resets switch 9 to connect conductor 11 to conductor 10. As a result, protective circuit 5 is reset to connect terminal T4 to terminal T5 at least for a period sufficient to enable the user to enter the car and operate ignition switch 14, which energizes ignition coil 4 to start the engine and results in a control signal from a terminal of the ignition coil to the protective circuit 5 via conductor 13. This control signal maintains the circuit path between terminals T4 and T5 whilst the engine is running irrespective of the voltage of battery 1. It will be appreciated that, by setting switch 9 before leaving the vehicle to cause protective circuit 5 to isolate terminals T4 and T5, the user prevented the battery 1 from being discharged accidentally through any vehicle lights which inadvertently had been left on for example.

However, the user might forget to set switch 9 to isolate terminals T4 and T5 on leaving the vehicle and might also inadvertently leave the vehicle headlights switched on for example. In such a case, the battery 1 would tend to discharge completely, with the result that it might not be possible to energise the ignition system from the battery when returning to the vehicle. To avoid such a possibility, the protective circuit 5 is arranged to monitor the battery voltage across terminals T3 and T4 and to isolate terminal T5 from terminal T4 in the event that the battery voltage falls below a predetermined level, suitably 11.9 volts in the case of a nominally 12 volt car battery for example, to ensure that sufficient charge always remains in battery 1 to energise the ignition system and start the engine. The status of the protective circuit 5 is indicated by a status display 6 in the driving compartment which is connected to the protective circuit 5 by a conductor 16 and indicates at least whether terminal T5 is, or is not isolated from terminal T4. Status display 6 may also be arranged to indicate the voltage of battery 1 by means of a further conductors (not shown) connected between a voltmeter at the status display and terminals T3 and T4 for example.

Figure 2:
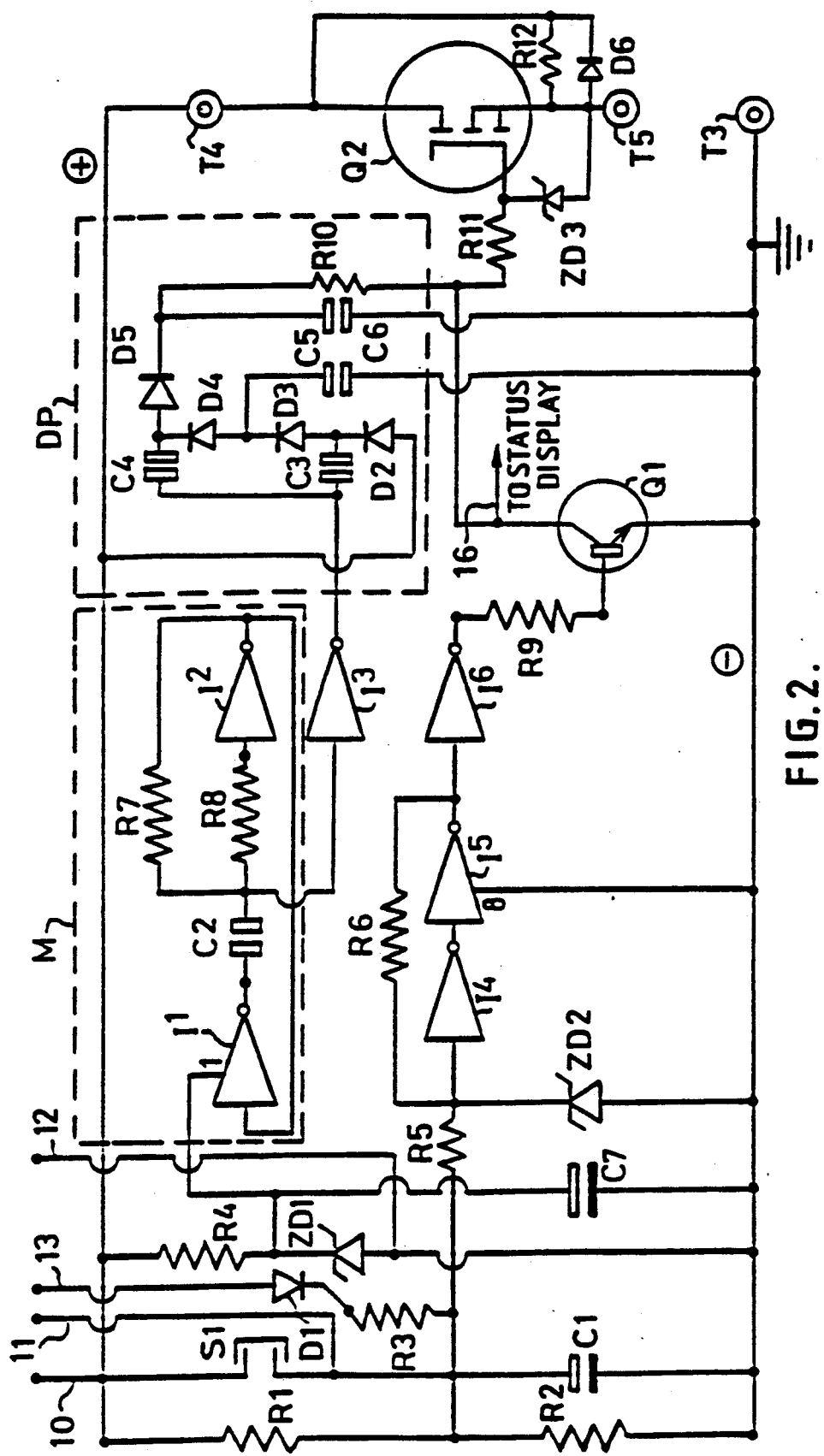
FIG. 2 is a circuit diagram of the protective circuit incorporated in the ignition system of FIG. 1.

Referring now to FIG. 2, protective circuit 5 comprises an FET switching transistor Q2 which has a very high current capacity and a very low internal resistance, such as a type IRF P044 for example. The state of this switching transistor is determined by the voltage at the junction of resistors R10 and R11, which is in turn determined by a further switching transistor Q1. A diode pump DP fed by a multivibrator M supplies the necessary voltage at the junction of R10 and R11 even when the voltage of battery 1 is below that required to switch transistor Q12.

A Schmidt trigger comprising two series-connected logic inverters $I^4$ and $I^5$ in parallel with a resistor R6 is connected to the base of transistor Q1 via a further logic inverter $I^6$ and a resistor R9. The state of this Schmidt trigger is dependent upon the voltage at the junction of resistors R3 and R5, i.e. the voltage at conductor 11 which, it will be recalled from the description of FIG. 1, can be connected either to conductor 10 or conductor 12 by means of switch 9. The junction of resistors R3 and R5, besides being connected to conductor 11, is also connected to the junction of two resistors R1 and R2, the free ends of which are connected between positive terminal T4 and negative (earth) terminal T3 respectively. The potential at this junction is accordingly proportional to the battery voltage and is suitably chosen to be approximately one quarter of the battery voltage. When the voltage at this junction falls below a predetermined level, suitably corresponding to a battery voltage at or below 11.9 volts, the output at inverter $I^5$ is at a low level so that the output inverter $I^6$ is at a high level and transistor Q1 is switched on switching off Q2 and thereby isolating terminal T5 from terminal T4 and hence isolating the battery.

As described above with reference to FIG. 1, when returning the vehicle the user may reset protective circuit 5 by connecting conductor 11 to conductor 10 with the result that the full battery voltage is applied to the junction of resistors R3 and R5 and charges a capacitor C1. A capacitor C1 discharges only slowly via resistor R2 and maintains a relatively high voltage at the input of the Schmidt trigger which is sufficient to switch off transistor Q1 and hence switch on transistor Q2 for a time sufficient for the user to operate the ignition key 14 (FIG. 1). Accordingly, the engine is started and the ignition coil 4 (FIG. 1) is energized, with the result that the full battery voltage appears at conductor 13 and is transmitted via diode D1 and resistor R3 to the input of the Schmidt trigger via resistor R5 and thereby maintains transistor Q2 on.

A reset switch S1 is provided on the circuit board to enable conductors 10 and 11 to be connected at the circuit board if necessary.

The threshold voltage of the Schmidt trigger depends on the threshold voltage of the inverters $I^4$ and $I^5$ which is in turn dependent on the voltage of their power supply. Each of logic inverters $I^1$ and $I^6$ is incorporated in a common hex inverter in the form of a CMOS integrated circuit such as a type 4049 for example. The positive power supply terminal for this integrated circuit is connected to inverter $I^1$ and to the junction of an 8.2 volt zenor diode ZD1 and a resistor R4. A smoothing capacitor C7 is connected across ZD1 in order to smooth this voltage and to lower the power supply impedance. In order to take advantage of the lower current consumption of COS devices, resistors R1, R2 and R4, which largely determine the current consumption of the protective circuit, are of relatively high value such that the total current consumption is of the order of 10 milliamps of less.

Multivibrator M comprises two inverters $I^1$ and $I^2$ provided with a phase-shift capacitor C2 and resistor R8. A resistor R7 provides positive feedback at the junction of C2 and R8 and as a result, a square wave oscillation having an amplitude of approximately 8 volts appears at this junction which is inverted by inverter $I^3$. A square wave oscillation of amplitude approximately 7 volts superimposed on a DC level of approximately 12 volts appears at the junction of capacitor C3, and diodes D2 and D3 of diode pump DP. This is smoothed by capacitor C5 to 19 volts DC and at the next stage in the diode pump, namely at the junction of diode D4 and D5, and capacitor C4 a similar square wave oscillation is superimposed on this level which is smoothed to a DC voltage of approximately 25 volts by capcitor C6. This voltage is then fed via resistor R10 and resistor R11 to the gate of transistor Q2. A resistor R12 of value approximately 1 megohm is connected between the source and drain of transistor Q2 and presents terminal T5 from being completely isolated from terminal T4. This enables circuits such as clock circuits in the vehicle to continue to function irrespective of the state of the protective circuit. Furthermore, a diode D6 is connected between terminals T4 and T5 to enable currents to flow between these terminals in the reverse direction to charge the battery. A protective diode ZD3 is connected between the source and gate of transistor Q2 and a further protective diode ZD2 is connected between the earth rail of the circuit and the input of the Schmidt trigger at its junction with resistors R5 and R6.

The low current consumption achievable by the circuit described above enables a motor vehicle incorporating such a circuit to be left unattended for several weeks without risk of the battery being discharged.

In an alternative embodiment, the circuit may be arranged to be reset merely by turning the ignition key, so that the separate switch 9 shown in FIG. 1 may be dispensed with.

Figure 3:
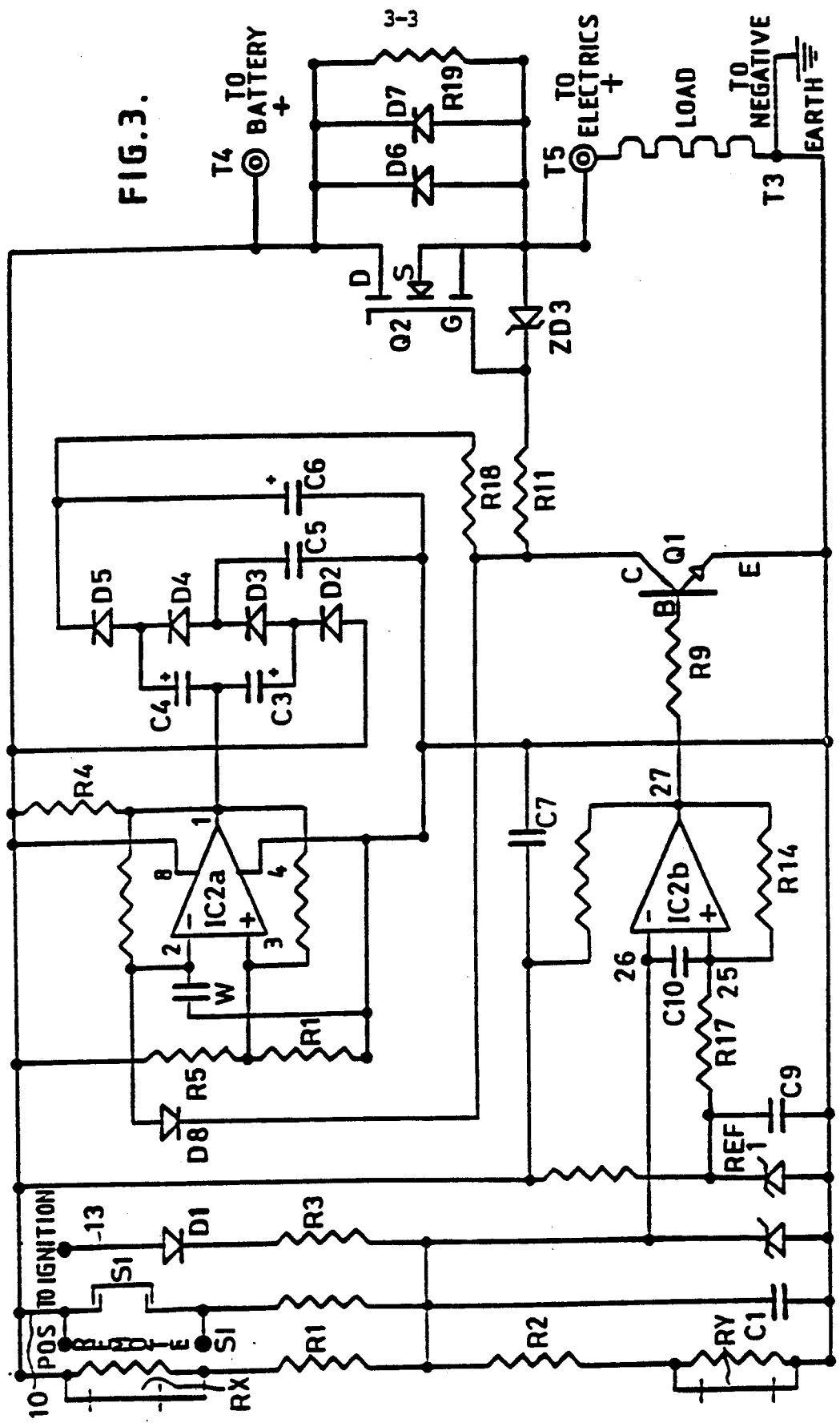
FIG. 3 is a circuit diagram of a modification of the circuit shown in FIG. 2.

Referring now to the modification shown in FIG. 3, elements in this Figure that are equivalent to elements in FIG. 2 are designated by the same reference symbols as in that Figure. Dealing first with the ON mode of operation of the arrangement of FIG. 3, a reference diode Ref. 1 provides a voltage of 5 volts which is divided down through a resistor R17 and a hysteresis resistor R14 to a pin 27 of a comparator IC2B. As or output at pin 27 of this device in the ON mode is very nearly 0 volts the level at pin 25 is 3.4 volts, plus the minus a small error. In normal conditions the battery voltage is sufficient to produce a level at a negative input pin 26 (provided by the precision divider network RX, R1, RY, R2) which will be high enough to prevent the device changing state. This means that the near 0 voltage is applied to the base of the transistor Q1 and holds it firmly off. This in turn allows the voltage built up by a voltage multiplier (IC2a, D2-D, C3-C6) to turn on Q2 through R11, allowing up to 60 amps of current to the load.

The voltage multiplier is a modified version of the classic form, and uses IC2a as a low frequency oscillator, to provide square waves which are effectively summed, to provide 29 volts from a 12 volt source. This provides a sufficiently high voltage to ensure that the source S-gate G potential of Q2 can be maintained at full saturation. This essential because the drain D is connected to the battery side of the load, and this point will float up to near battery voltage when Q2 is fully conducting. Any overvoltage on the gate G is conducted safely away by ZD3.

Turning now to the OFF mode of operation of the circuit of FIG. 3, when the battery voltage falls to about 11.90 volts the crossover point on the comparator IC2b is reached, and when the potential on pin 26 falls a few millivolts below the reference level on pin 25, the comparator changes state. The output at pin 27 rises to near battery voltage, causing Q1 to conduct fully on. The output from the voltage multiplier is now dropped across R18, and a near ground potential is applied to the gate G of Q2 turning it fully off. This is the OFF mode.

The hysteresis resistor R14 now allows the reference voltage on pin 25 of IC2b to rise by several volts, preventing re-triggering.

A diode D8 will be forward biased when Q1 is turned on, and this has the effect of disabling the oscillator IC2a. Without its input of square waves, the voltage multiplier will cease to function. This reduces the power consumption of the device in the OFF mode to about 1 mA plus a further 1 mA allowed by a resistor R19 referred to below. This discharge rate is low enough for a 10 amp hour battery charge to take over six months to drain.

Diodes D6 and D7 provide a reverse path back to the battery for normal charging and will handle 6 amps, with a forward voltage drop of approximately 0.6 volts. Larger charging currents of up to 60 amps, can be passed through the internal reverse diode provided in Q2, at a forward drop of approximately 1.6 to 2 volts.

The aforesaid resistor R19 is provided for an optional remote security module allowing the user deliberately to shut down the electrical system to immobilise the vehicle. Then R19 suplies sufficient power to run a clock. The reset switch S1 may be operated remotely (via the remote module) or locally.

Diode D1 and resistor R3 are fed at at least 4 volts from the coil 4 when the ignition switch is on or the engine is running. This prevents the device from switching to the OFF mode even if the battery voltage falls below its trigger level.

Capacitors C, C7, C9 and C10 are provided to remove surge, spikes and surges. As in FIG. 2, C1 provides the short time delay in the triggering of the circuit from the ON to the OFF mode.

The resistors RX and RY are trim resistors.

I claim:

1. A protective circuit for battery discharge circuit protection in a battery-powered engine ignition electrical system for a vehicle, boat, aircraft or hovercraft wherein said circuit is an entirely solid state circuit comprising a switching transistor means (Q2) to control connection between a battery terminal (T4) and an electrical load means (e.g.4), means (9) for manually switching said switching transistor means to open or close said connection between the battery terminal and said load means, means (T4, R1, R2, T3, R3, R5) for automatically switching the said switching transistor means to open or close the said connection between said battery terminal and the said load in relation to a predetermined battery discharge condition, and a voltage multiplier (M, DP or IC2a, DP) for maintaining a sufficient stable voltage to control said switching transistor means irrespectively of varying load currents and battery voltage.

2. A protective circuit according to claim 1, wherein said electrical load includes an ignition system means and said means for manually switching the said switching transistor means operates to isolate said battery terminal from said ignition system means to thus provide an anti-theft device by disabling the engine ignition system.

3. A protective circuit according to claim 1, wherein the means for automatically switching the switching transistor means comprises a voltage divider (R1, R2), a voltage reference (Ref. 1), a voltage comparator (1C2b) and transistor (Q1) for automatically triggering said switching transistor means (Q2) to open the said connection at a predetermined voltage threshold, thereby providing battery discharge protection while preserving a sufficient remaining charge to enable the engine to be started.

4. A protective circuit according to claim 1, further comprising means (D8) for disabling said voltage multiplier when the said switching transistor means is switched to disconnect the battery terminal from said load.

5. A protective circuit according to claim 1, wherein said voltage multiplier comprises a low frequency oscillator (1C2A) for providing square waves that are summed by a diode pump to provide sufficiently high voltage for a gate (G) potential of the switching transistor (Q2) to be maintained at full saturation.

6. A protective circuit according to claim 1, wherein said means for manually switching the switching transistor means comprises a single switch operative to trigger said switching transistor means to open the said connection and thereafter to trigger the switching transistor means to close said connection and reactivate the battery circuit long enough for the engine to be started, and wherein said load includes an ignition coil (4) and means (13) for connecting said ignition coil and the said means for manually and automatically switching said switching transistor means for maintaining the reconnection of said battery circuit when the engine is running.

7. A protective circuit according to claim 1, further comprising a receiver means (7) for electromagnetic waves or an ultrasonic signal, for actuating the switch (9) for resetting the said connection in response to a predetermined electromagnetic or ultrasonic signal generated by a hand-held transmitter (8).

8. A protective circuit according to claim 1, wherein at least one diode D6, D7) is connected in parallel with said switching transistor means to provide a supplementary reverse path back to the battery terminal for normal charging of the battery.

9. A protective circuit according to claim 1, wherein said circuit is responsive to a control signal to override the said means for automatically switching the said switching transistor to close and maintain said connection while said ignition system is energized.

10. A protective circuit according to claim 1, further comprising a status display means (6) remote from said protective circuit and responsive to and indicative of at least the state of said switching transistor means (Q2).

* * * * *